(12) United States Patent
Dupont De Dinechin et al.

(10) Patent No.: US 10,915,488 B2
(45) Date of Patent: Feb. 9, 2021

(54) INTER-PROCESSOR SYNCHRONIZATION SYSTEM

(71) Applicant: KALRAY, Orsay (FR)

(72) Inventors: Benoît Dupont De Dinechin, Grenoble (FR); Vincent Ray, Orsay (FR)

(73) Assignee: KALRAY, Orsay (FR)

( * ) Notice: Subject to any disclaimer, the term of this patent is extended or adjusted under 35 U.S.C. 154(b) by 558 days.

(21) Appl. No.: 14/716,298

(22) Filed: May 19, 2015

(65) Prior Publication Data
US 2015/0339256 A1   Nov. 26, 2015

(30) Foreign Application Priority Data

May 21, 2014 (FR) .................. FR14 54591

(51) Int. Cl.
| G06F 9/30 | (2018.01) |
| G06F 9/52 | (2006.01) |
| G06F 13/42 | (2006.01) |
| G06F 15/82 | (2006.01) |
| G06F 15/173 | (2006.01) |

(52) U.S. Cl.
CPC ...... *G06F 13/4278* (2013.01); *G06F 9/30087* (2013.01); *G06F 9/52* (2013.01); *G06F 15/17325* (2013.01); *G06F 15/82* (2013.01)

(58) Field of Classification Search
CPC .......................... G06F 13/4265; G06F 9/30087
USPC ........................................................ 712/375
See application file for complete search history.

(56) References Cited

U.S. PATENT DOCUMENTS

| 5,317,734 A * | 5/1994 | Gupta | ..................... G06F 8/458 |
| | | | 709/213 |
| 7,032,099 B1 * | 4/2006 | Imamura | ................... G06F 9/52 |
| | | | 712/29 |
| 7,062,767 B1 * | 6/2006 | McCarthy | ............... G06F 13/36 |
| | | | 712/225 |

(Continued)

OTHER PUBLICATIONS

Gwennap, Linley. "VLIW: The Wave of the Future Processor Design Style Could Be Faster." Cheaper Than RISC (1994): 18. (Year: 1994).*

(Continued)

*Primary Examiner* — Jacob Petranek
(74) *Attorney, Agent, or Firm* — Oliff PLC

(57) ABSTRACT

An inter-processor synchronization method using point-to-point links, comprises the steps of defining a point-to-point synchronization channel between a source processor and a target processor; executing in the source processor a wait command expecting a notification associated with the synchronization channel, wherein the wait command is designed to stop the source processor until the notification is received; executing in the target processor a notification command designed to transmit through the point-to-point link the notification expected by the source processor; executing in the target processor a wait command expecting a notification associated with the synchronization channel, wherein the wait command is designed to stop the target processor until the notification is received; and executing in the source processor a notification command designed to transmit through the point-to-point link the notification expected by the target processor.

11 Claims, 2 Drawing Sheets

(56) References Cited

U.S. PATENT DOCUMENTS

| | | | | |
|---|---|---|---|---|
| 2001/0020265 A1* | 9/2001 | Hoogerbrugge | ...... | G06F 9/3806 712/24 |
| 2001/0042189 A1* | 11/2001 | Babaian | ...... | G06F 9/52 712/23 |
| 2002/0016879 A1* | 2/2002 | Miller | ...... | G06F 8/457 710/200 |
| 2005/0165938 A1* | 7/2005 | Cornett | ...... | H04L 49/90 709/229 |
| 2010/0095090 A1* | 4/2010 | Unno | ...... | G06F 9/52 712/30 |
| 2010/0115236 A1* | 5/2010 | Bataineh | ...... | G06F 9/52 712/29 |
| 2011/0087860 A1* | 4/2011 | Nickolls | ...... | G06F 9/522 712/22 |
| 2012/0191441 A1* | 7/2012 | Wu | ...... | G06F 9/52 703/20 |
| 2013/0160028 A1* | 6/2013 | Black | ...... | G06F 15/17325 719/314 |
| 2014/0160138 A1* | 6/2014 | Nalluri | ...... | G06F 9/52 345/541 |
| 2014/0325468 A1* | 10/2014 | Satoh | ...... | G06F 30/33 716/136 |
| 2015/0012667 A1* | 1/2015 | Carlson | ...... | G06F 9/546 709/248 |
| 2015/0067215 A1* | 3/2015 | Henry | ...... | G06F 1/3237 710/261 |

OTHER PUBLICATIONS

Gupta, Rajiv. "A fine-grained MIMD architecture based upon register channels." Microprogramming and Microarchitecture. Micro 23. Proceedings of the 23rd Annual Workshop and Symposium., Workshop on. IEEE, 1990. (Year: 1990).*

Gupta, Rajiv, Michael Epstein, and Michael Whelan. "The design of a RISC based multiprocessor chip." Proceedings of the 1990 ACM/IEEE conference on Supercomputing. IEEE Computer Society Press, 1990. (Year: 1990).*

Lee, Sunah, and Rajiv Gupta. "Executing loops on a fine-grained MIMD architecture." Proceedings of the 24th annual international symposium on Microarchitecture. ACM, 1991. (Year: 1991).*

Araujo et al., "Platform designer: An approach for modeling multiprocessor platforms based on SystemC," Des Autom Embed Syst, vol. 10, pp. 253-283, 2006.

Rajiv Gupta; "Employing Register Channels for the Exploitation of Instruction Level Parallelism;" 1990; pp. 118-127; Association for Computing Machinery.

* cited by examiner

INTER-PROCESSOR SYNCHRONIZATION SYSTEM

FIELD

The invention relates to the synchronization of several processors running in parallel threads of a same program sharing a same resource, and more specifically to a communication system allowing processors to write data directly into the register files of neighboring processors.

BACKGROUND

The paper [Rajiv Gupta, "Employing Register Channels for the Exploitation of Instruction Level Parallelism", PPOPP '90 Proceedings of the Second ACM SIGPLAN Symposium on Principles & Practice of Parallel Programming, Pages 118-127] describes an inter-processor communication system using "register channels". A "register channel" identifies a communication channel that allows a source processor to write data in a designated register of a target processor through a point-to-point connection between the source and target processors. The register in question may be included in the register file of the target processor, whereby data written in the register are accessible by the processor without latency, in one clock cycle.

A synchronization flag is added to each register that can be used for a channel. A specific instruction set is designed to perform operations on the channels, combining local and remote accesses to the registers, and management of the synchronization flags.

In a channel established between a source processor and a register of a target processor, the channel flag is initially 0, indicating that the register is not up to date. The flag is set to 1 when the source processor writes data in the channel. To use the register contents, the target processor executes a register read command, which resets the flag to 0.

If the read instruction executed by the target processor sees the flag at 0, the target processor stops until the flag is switched to 1. If the write instruction executed by the source processor sees the flag at 1, the source processor stops until the flag is switched to 0.

This system is based on the knowledge by the source processor of the state of the channel flag before writing in the channel. This involves the execution beforehand in the source processor of a remote read through the channel for testing the flag, or the provision of a wire transmitting the status of the flag in the point-to-point link between the processors. In practice, a single register per processor is assigned to a channel in such a system.

The fact that a channel flag is toggled or probed by instructions that are also used to manipulate data may deprive the programmer of flexibility to perform optimizations, particularly in the context of VLIW architecture processors.

SUMMARY

An inter-processor synchronization method using point-to-point links is generally provided, comprising the steps of defining a point-to-point synchronization channel between a source processor and a target processor; executing in the source processor a wait command expecting a notification associated with the synchronization channel, wherein the wait command is designed to stop the source processor until the notification is received; executing in the target processor a notification command designed to transmit through the point-to-point link the notification expected by the source processor; executing in the target processor a wait command expecting a notification associated with the synchronization channel, wherein the wait command is designed to stop the target processor until the notification is received; and executing in the source processor a notification command designed to transmit through the point-to-point link the notification expected by the target processor.

The method may comprise the further steps of, in the target processor, at the latest together with the execution of the notification command, executing an instruction that releases a shared resource; and in the source processor, at the latest together with the execution of the notification command, executing an instruction for writing in the shared resource.

The shared resource may be a register of the target processor register file, and the write instruction be designed to update the register through the point-to-point link.

The method may comprise the further steps of providing a dedicated synchronization instruction in the instruction set of the processors, designed to execute in parallel a wait command and a notification command identified by a parameter of the synchronization instruction; in the source processor, configuring the wait command and the notification command in a first synchronization instruction; and executing in the source processor the first synchronization instruction, whereby:
  the wait command prevails and suspends the execution of the notification command until the notification is received from the target processor,
  the notification command is executed upon receipt of the notification from the target processor,
  if the notification from the target processor is received on or before the execution of the first synchronization instruction, the wait and notification commands are executed in parallel.

The processors may have a VLIW architecture enabling parallel execution of multiple instructions conveyed in a same VLIW packet, the method comprising the steps of, in the target processor, at the latest together with the execution of the notification command, executing an instruction that releases a shared resource; and executing in the source processor, in the same VLIW packet, the first synchronization instruction and an instruction for writing in the shared resource, whereby the notification command and the write instruction are executed in parallel upon receipt of the notification from the target processor.

The method may comprise the following steps carried out in the target processor:
  configuring the wait command in a second synchronization instruction;
  configuring the notification command in a third synchronization instruction; and
  executing the third synchronization instruction and the instruction releasing the shared resource in the same VLIW packet.

The method may comprise the further steps of designing the dedicated synchronization instruction to execute in parallel a selected number of wait commands and a selected number of notification commands; and identifying the selected wait and notification instructions in a parameter of the instruction.

The method may comprise the further steps of identifying the synchronization channel by a unique identifier; and using the unique identifier as a parameter of the wait and notification commands related to the synchronization channel.

The method may comprise the further steps of, at the execution of a notification command in a local processor for a remote processor, presenting the unique identifier on the point-to-point link between the local and remote processors; in the remote processor, writing the unique identifier in an event register; and at the execution of the wait command in the remote processor:

comparing the content of the event register to the parameter of the wait command; and if the comparison is satisfied, resuming execution and resetting the content of the event register.

The method may comprise the further steps of identifying each distinct synchronization channel by setting a respective bit of an identifier having a format common with the event registers of all processors; writing in the event register of the remote processor all the bits that are set in the identifiers presented on all the point-to-point links arriving to the remote processor; and, at the execution of the wait command in the remote processor, resuming execution if all the bits that are set in the parameter of the wait command are set in the event register, whereby a wait command can be configured to wait for notifications of multiple processors at once.

BRIEF DESCRIPTION OF DRAWINGS

Other advantages and features will become more clearly apparent from the following description of particular embodiments of the invention provided for exemplary purposes only and represented in the appended drawings, in which.

DESCRIPTION OF EMBODIMENTS

Figure 1:
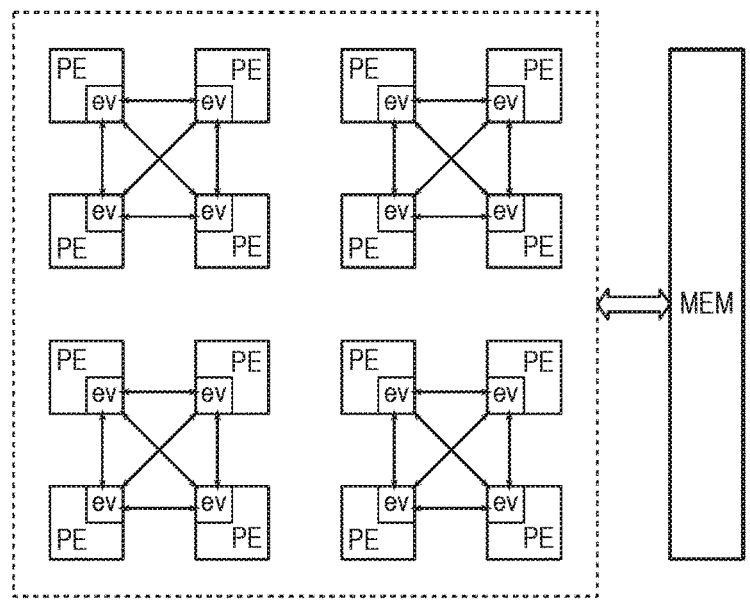
FIG. 1 is a block diagram of an array of processors divided into groups in which processors can communicate via point-to-point links.

FIG. 1 shows an exemplary 4×4 array of processors PE. The processors PE may be connected to a common bus also connected to a shared memory MEM. The memory MEM may contain the code of the programs executed by the processors and the work data of the programs.

As mentioned above, each processor typically has a dedicated register file, used for manipulating the operands used by the processor instruction set. To implement an inter-processor communication method using register channels, the processors may be grouped by four neighboring processors, as shown. Each processor in a group is connected to the three other processors of the group by point-to-point links. The number of processors in a group is determined in practice by the number of point-to-point links that can be wired between the processors in the available surface area of the array.

The point-to-point links, associated with interfaces EV of the processors, are designed to allow each processor to write data directly in a designated register of any other processor of the group. With the synchronization techniques described below, no particular constraint is imposed on the designated register. The register may be dedicated or arbitrarily chosen in the register file of the target processor. "Target processor" designates a processor that receives in one of its registers data written by a "source processor" through the point-to-point link connecting the two processors. The target processor and the designated register define a "register channel".

A particular inter-processor synchronization technique is proposed herein that uses shared resources, in particular register channels. This technique uses dedicated commands that can be integrated into the processor instruction set. The commands include a notification command (NOTIFY), a notification wait command (WAIT), and a remote-write command.

Such commands may be used to perform inter-processor synchronization in software and thus in a flexible manner, as discussed hereafter in the context of an exemplary inter-processor communication using register channels.

The NOTIFY and WAIT commands are contextual and depend on the nature of the processor (source or target) in which they are executed.

In a target processor, a NOTIFY command may indicate to the source processor, through the corresponding point-to-point link, that the register channel is free, i.e. that the local register allocated to the channel is available.

In a source processor, a NOTIFY command may indicate to the target processor that the source processor has written data in the channel.

In the source processor, a WAIT command may be executed to wait for the free-channel notification from the target processor. In the target processor, the WAIT command may be executed to wait for the write-notification from the source processor. A WAIT command is blocking in that it halts the processor until the expected notification is received. This combination of instructions separates the CPU halts from the operations that manipulate data in the register assigned to the channel.

The following figures illustrate several possibilities of using such commands, in the context of an exemplary simple loop that is run in parallel on three processors. Each iteration of the loop increments a first index by 1, increments a second index by 2, and accumulates the sum of the two indices. This loop is distributed over three processors PE1, PE2 and PE3. The processor PE1 calculates the current value of the first index and stores it in a local register, designated r10 as an example. The processor PE3 calculates the current value of the second index and stores it in a local register, designated r12. The processor PE2 receives the current values of the two indices in respective registers, designated r50 and r52, and accumulates their contents in respective local registers, designated r30 and r32.

The source processors PE1 and PE3 loop through the following iteration:

incrementing the index register (ADD), waiting for the availability of the channel to processor PE2 (WAIT), writing the index register content in the channel (LD), and notifying the write operation to the target processor (NOTIFY).

The target processor PE2 loops through the following iteration:

notifying to each of the processors that the register channel is ready (NOTIFY), waiting for the local registers r50 and r52 to be updated by each of the processors PE1 and PE3 (WAIT), and adding the contents of the registers r50 and r52 to the registers r30 and r32 (ADD).

Two series of WAIT and NOTIFY commands are executed in the target processor PE2, respectively associated with the two source processors PE1 and PE3. No particular order needs to be respected in principle between the commands associated with the two source processors.

Figure 2:
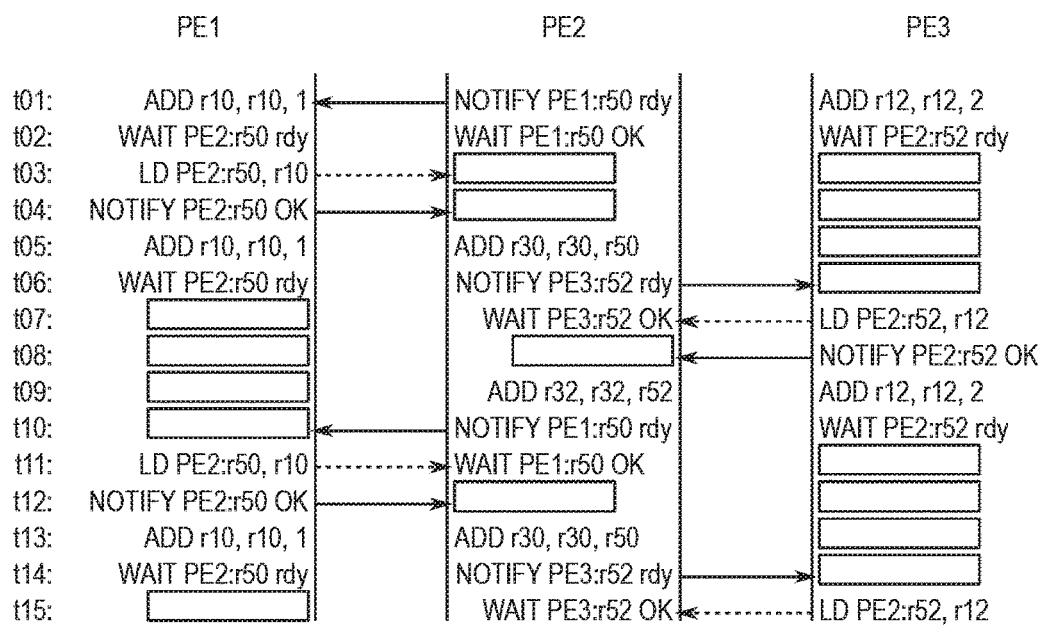
FIG. 2 illustrates an exemplary synchronization sequence between processors according to a protocol using notifications.

FIG. 2 illustrates a first possibility of sequencing the instructions in the target processor PE2, and a corresponding sequence of instructions in the source processors PE1 and PE3. In this sequence, the instructions are scheduled in the target processor for processing one source processor after the other.

At the beginning of the loop, at a cycle t01, the processors PE1 and PE3 execute an ADD instruction to increment their indices (respectively stored in the registers r10 and r12). The processor PE2 executes a NOTIFY instruction for signaling to the processor PE1 that the channel "PE2:r50" (register r50 of processor PE2) is ready.

In the next cycle t02, the three processors execute a WAIT instruction, the source processors to wait for a channel-ready notification (PE2:r50, PE2:r52) and the target processor to wait for a remote-write notification from processor PE1.

At cycle t03, the processor PE1 exits the wait state, since the expected notification was received at cycle t01. The processor PE1 executes a remote-write instruction LD to transfer the content of the local register r10 to the register r50 of the target processor. The processors PE2 and PE3 continue waiting for a notification, which is illustrated by a white rectangle in the place of an instruction.

At cycle t04, the processor PE1 executes a notification instruction for signaling to the processor PE2 that the expected data has been transferred. In response, the processor PE2 will exit its wait state at the next cycle. The processor PE3 is still waiting.

At cycle t05, the processor PE1 starts a new loop iteration—it increments its index r10 by executing an ADD instruction. The processor PE2 exits its wait state and executes an ADD instruction to accumulate the content of register r50 in the register r30. The processor PE3 is still waiting.

At cycle t06, the processor PE1 executes a WAIT instruction to wait for a new channel-ready notification. The processor PE2 initiates the communication with the processor PE3 and executes a NOTIFY command for signaling to the processor PE3 that its channel is ready. In response, the processor PE3 will exit its wait state at the next cycle.

At cycle t07, the processor PE1 remains in a wait state. The processor PE2 executes a WAIT instruction to wait for the remote writing of new data by processor PE3 in the register r52. The processor PE3 exits its wait state and transfers the content of register r12 to the register r52 of processor PE2.

At cycle t08, the processors PE1 and PE2 remain in the wait state. The processor PE3 executes the NOTIFY instruction expected by the processor PE2—the processor PE2 will exit its wait state at the next cycle.

At cycle t09, the processor PE1 remains in the wait state. The processor PE2 accumulates the content of register r52 in the register r32 by the execution of an ADD instruction. The processor PE3 starts a new loop iteration by incrementing the index r12.

An iteration having thus been described in each of the processors, the reader will readily understand the remainder of the shown execution sequence.

It may be noted that the execution sequence includes many wait cycles in the processors, up to four cycles per iteration in the source processors PE1 and PE3. These wait cycles may in part be due to the fact that, in this example, the target processor executes six instructions per iteration (three instructions for each source processor), while each of the source processors executes only four instructions per iteration. In theory, a minimum of two wait cycles could be reached per iteration on the source processors.

The WAIT and NOTIFY instructions, as shown in FIG. 2, can be executed with parameters. These parameters may identify the source or target processor, the register of the target processor, and the nature of the event. In practice, it is not useful that these instructions convey that much information. It suffices that the processor group shares a set of channel numbers, and that each (target processor, register number) pair is assigned a unique channel number arbitrarily selected by the programmer in the set of channel numbers. Thus, the WAIT and NOTIFY instructions may convey hereinafter only the channel number as a parameter, the channel between processors PE1 and PE2 being designated by ch1, and the channel between processors PE3 and PE2 being designated by ch2.

Figure 3:
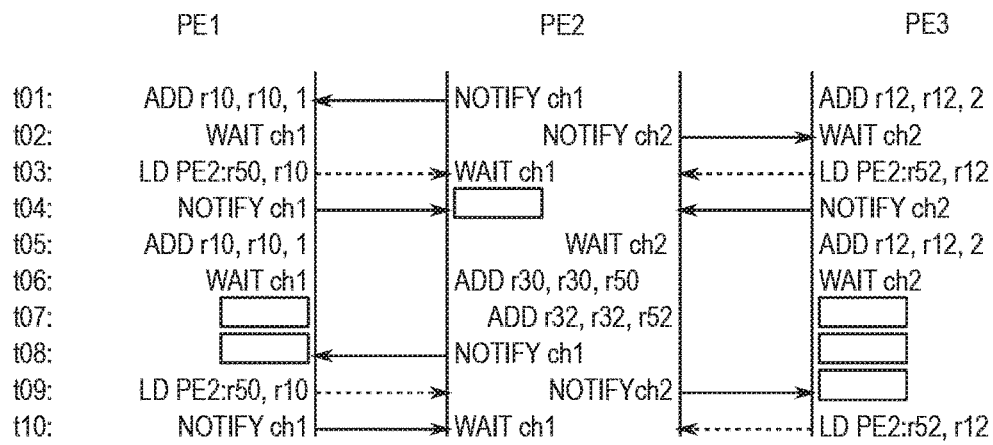
FIG. 3 illustrates another exemplary synchronization sequence in the same context as in FIG. 2.

FIG. 3 illustrates another possible instruction schedule in the target processor PE2, and a corresponding instruction schedule in the source processors PE1 and PE3. In this example, the instructions are scheduled in the target processor to process in turn the instructions aimed at the two source processors. It follows that the instructions of same type are grouped. As shown in FIG. 3, the processor PE2 executes, for one iteration, the first two NOTIFY instructions, then the two WAIT instructions, and finally the two accumulation instructions.

This choice results in a significant reduction of the wait cycles in the source processors. Pursuing the execution sequence of FIG. 3, after a transitional instruction alignment phase in the first loop iterations, a stable regime is reached with two wait cycles per iteration in processors PE1 and PE3.

Both execution sequences of FIGS. 2 and 3 show that different execution order choices of the WAIT and NOTIFY instructions, particularly in the target processor, produce more or less effective sequences in terms of wait cycles. It turns out, in the present example, that a good choice was to group together the instructions of same type. This choice could be less effective in other situations. Furthermore, the described examples do not take account of the processing unit pipeline depths associated with the different instructions. It was assumed that each instruction was executed in one cycle for the sake of simplification, but in practice some instructions take more cycles to complete than others, which increases the number of possible synchronization patterns. In summary, using WAIT and NOTIFY instructions in the manner described here to ensure inter-processor synchronization offers flexibility to the programmer, allowing him to seek the most efficient code in all situations.

Synchronization using two separate WAIT and NOTIFY instructions for each write in a register channel could require more clock cycles compared to a synchronization flag solution such as described in the above mentioned article by Rajiv Gupta. Hereinafter approaches are provided for reducing the number of clock cycles.

A Very Large Instruction Word (VLIW) processor architecture includes several instruction processing units which operate in parallel, for instance two arithmetic and logic units (ALU), a floating point calculation unit (FPU), a data read/write unit, and a branching unit. Such a processor can execute in parallel, for example, two additions, one multiplication, moving data between registers, and a conditional branch. The compiler for such a processor takes care of placing instructions that can be executed in parallel in "VLIW packets".

To save clock cycles, one might consider placing WAIT, NOTIFY, and remote write instructions in one VLIW packet (e.g. the instructions of the cycles t02 to t04 of processor PE1). The WAIT instruction could be processed by a modified branch unit and the NOTIFY instruction by a modified read/write unit. If the processor does not have a second read/write unit, the remote write instruction could not be processed in the same VLIW packet or cycle. However, ALU units also have writing or reading functionality, since they are designed to write the result of an operation in a register or at an address—a remote write operation of the type LD PE2:r50, r10 (transfer the content of register r10 to the register r50 of processor PE2) can be rewritten as ADD PE2:r50, r10, 0 (place the sum of the content of the register r10 and 0 in the register r50 of processor PE2) by modifying the ALU unit so that it can communicate over the point-to-point links.

These measures could not be sufficient, especially in the situation of FIG. 3 where it is desired to group similar instructions together. In particular, it is difficult to group two WAIT instructions in a single VLIW packet without providing two branching units to process them in parallel. Generally, one processor may be required to process more than two register channels concurrently, so it is not reasonable in terms of surface area and power consumption to provide dedicated processing units to satisfy all situations.

Instead of providing separate WAIT and NOTIFY instructions, it is proposed herein, in the context of VLIW processors, to combine WAIT and NOTIFY commands in a single so-called "group synchronization" instruction designated by SYNCGRP. The WAIT and NOTIFY commands to be combined may be chosen such that the WAIT command is the one executed before the NOTIFY command in the sequential system (FIGS. 2 and 3), for example the WAIT and NOTIFY commands of cycles t02 and t04 in processor PE1.

In addition, it may be provided to run in the same VLIW packet as the SYNCGRP instruction the operation that causes the notification, such as the writing (LD) in the register channel ch1 at cycle t03 by the processor PE1.

It may seem surprising to run in parallel a WAIT command and a subsequent NOTIFY command, since the NOTIFY command can only be issued, in principle, at the end of the wait cycle, at the earliest simultaneously with the event that triggered it (LD). In fact, the WAIT command can be processed by the branching unit that, because of its shallow pipeline, has an immediate reaction time compared to the other processing units involved. As a result, if the condition to exit the wait state is not met, the branching unit stops the processor before the other commands (NOTIFY) and instructions (LD) of the VLIW packet are able to complete. When the expected notification is received, the branching unit wakes the processor from its wait state, whereby the other commands and instructions of the VLIW packet complete their execution.

The NOTIFY command may be processed by the read/write unit in parallel with the branching unit that processes the WAIT command.

A particularly simple structure described later may be used to configure the SYNCGRP instruction sot that it can process in parallel several WAIT commands and several NOTIFY commands without requiring multiple branching and read/write units. The SYNCGRP instruction may also be configured to ignore WAIT commands or NOTIFY commands. The processing of several WAIT commands in parallel upon execution of a SYNCGRP instruction boils down to waiting for the last notification associated with the WAIT commands.

Figure 4:
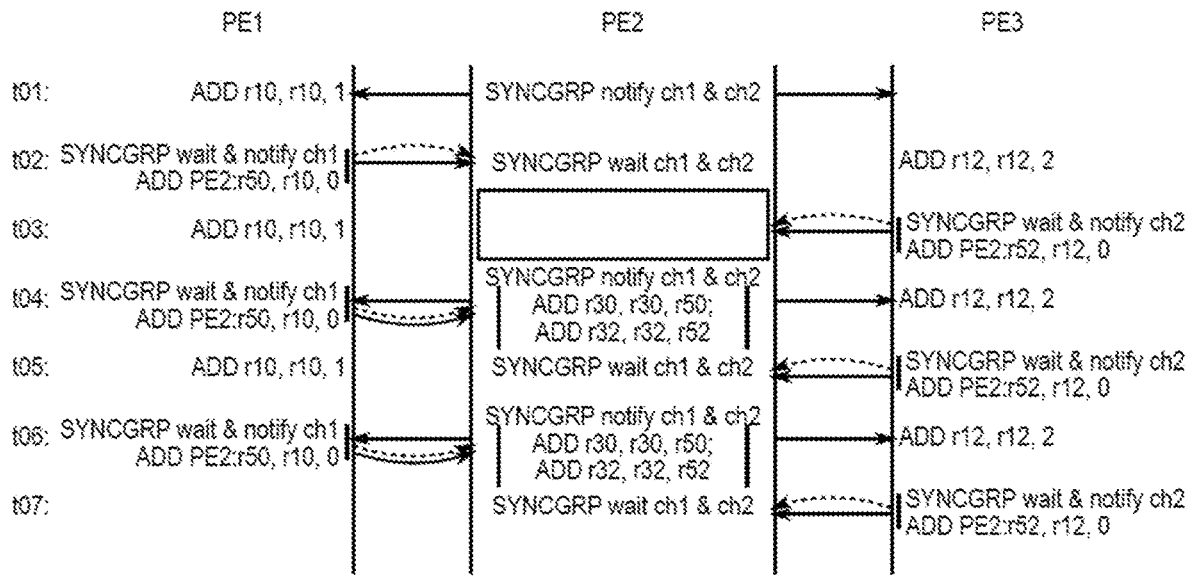
FIG. 4 illustrates the synchronization sequence of FIG. 3 when using group synchronization instructions.

FIG. 4 shows an exemplary execution sequence based on that of FIG. 3, using SYNCGRP instructions and VLIW packets. As regards the source processors PE1 and PE3, a SYNCGRP instruction is executed for each pair of consecutive WAIT and NOTIFY commands, and the remote-write instruction to the processor PE2 is placed in the same VLIW packet. Since the NOTIFY command of the SYNCGRP instruction can be implemented by the read/write unit, this unit is not available for the remote-write instruction in the same cycle. The remote-write instruction may be formatted for using the available ALU, for example in the form of an addition, the result of which is written in the designated register of the target processor (ADD PE2:r50, r10, 0). The index increment instructions are here executed separately, although they could have been included in the VLIW packets with the SYNCGRP instructions.

As regards the target processor, both NOTIFY commands of each iteration are grouped in a first SYNCGRP instruction, and both WAIT commands of each iteration are grouped in a second SYNCGRP instruction. The addition instructions using the designated registers (r50, r52) are integrated in the same VLIW packets as the "SYNCGRP notify" instructions, except the addition instruction of the first iteration.

This configuration achieves the same number of cycles (2) by iteration on each processor and a theoretical execution without wait cycles.

To reflect a situation closer to reality, where it is unlikely that the loops start simultaneously in the three processors, two different execution sequences are shown in processors PE1 and PE3, as an example, by starting the loop in processor PE3 with one cycle delay. This causes one wait cycle in processor PE2 at cycle t03. However, no further wait cycle appears in the execution sequences of the three processors.

To understand the exchange flows between the processors, the cycle t04 will be described. In this one cycle, target processor PE2 executes a VLIW packet that accumulates the contents of registers r50 and r52 in registers r30 and r32, and notifies the processors PE1 and PE3 that the registers r50 and r52 (channels ch1 and ch2) are ready. (The registers r50 and r52 have been updated in cycles t02 and t03, respectively.) On the side of processor PE3, the notification is not yet expected and it triggers nothing in cycle t04.

On the side of processor PE1, the notification arrives while the processor executes a VLIW packet that, in the same cycle, awaits the notification, issues a notification, and writes the content of register r10 in the register r50 of processor PE2. The wait is immediately lifted by the arrival of the notification, whereby the processor PE1 transfers the contents of register r10 (dotted arrow) and issues a notification (solid arrow).

The updating of the register r50 of processor PE2 thus occurs while its content is read to be accumulated in the register r30. There is however no conflict, because the accumulation operation (ADD) uses the state of the register r50 at the beginning of the cycle, while the update of register r50 occurs after the beginning of cycle.

As illustrated in this execution sequence, the SYNCGRP instruction can be configured to simultaneously process multiple WAIT commands (in practice one for each channel handled by the processor), and multiple NOTIFY commands (also one for each channel handled by the processor). For this purpose, the parameter passed to the SYNCGRP instruction may be a word comprising a respective notification field for each of the other processors of the group, and a field for identifying the notifications expected from any processor of the group. Each of these fields is used for recording the register channel numbers for which the processor sends or awaits notifications.

For a group of four processors, the word passed as a parameter may have a size of 32 bits in which three most significant bytes are used to identify the notifications sent respectively to the other three processors, and the least significant byte is used to identify the expected notifications. In each byte, a register channel may be identified by the position of a respective bit to 1, i.e. by a bit-mask. Each field can thus uniquely encode eight channels for the four processors, zero indicating that no notification is sent or expected. For example, the hexadecimal parameter 0x00010002 indicates that the local processor sends a notification for channel 0 ($0x01=2^0$) to the processor of rank 2 and expects a notification for channel 1 ($0x02=2^1$). The parameter 0x06000800 indicates that the local processor simultaneously sends notifications for channels 1 and 2 ($0x06=2^1+2^2$) to the processor of rank 3, a notification for channel 3 ($0x08=2^3$) to the processor of rank 1, and expects no notification. The parameter 0x0000000B indicates that the local processor does not send any notification and expects notifications for channels 0, 1 and 3 ($0x0B=2^0+2^1+2^3$).

Figure 5:
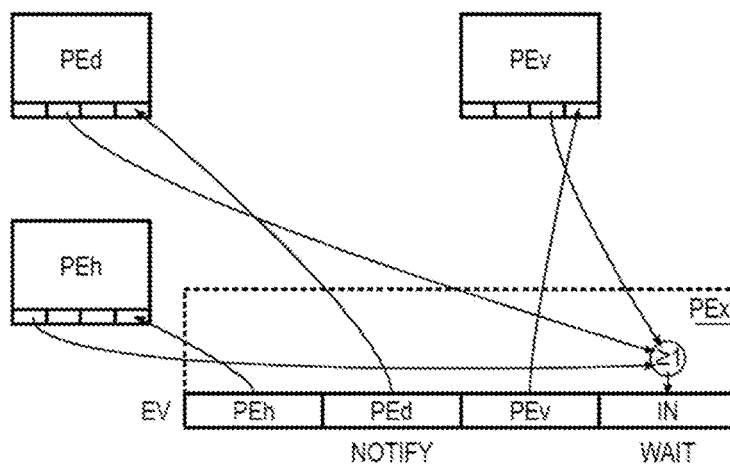
FIG. 5 is a block diagram illustrating point-to-point links between processors for conveying notifications.

FIG. 5 is a block diagram illustrating a detail of the point-to-point links between processors, allowing incorporation of the new SYNCGRP instructions in an existing processor architecture in a particularly simple manner. This figure illustrates the links for conveying notifications between processors.

Each processor of a group of processors connected by point-to-point links comprises an event register EV, shown in detail for a processor PEx. This register corresponds to the parameter of the SYNCGRP instruction—it includes a notification field dedicated to each of the other processors of the group, writable by the local processor. In the example of a group of four processors, PEv designates the vertically adjacent processor, PEh designates the horizontally adjacent processor, and PEd designates the diagonal processor. The notification fields are designated by these same references. Moreover, the register EV includes an inbound notification field IN writable by all other processors in the group.

Each notification field is wired to the IN field of the corresponding remote processor. All links are not shown for reasons of clarity. The wiring of the IN fields is illustrated in more detail for the local processor PEx. In the case where the register channels are identified by a bit-mask, the IN field may actually be wired to receive a bitwise OR of the contents of the corresponding notification fields of the other processors. The IN register field thus tracks the history of notifications received by the local processor. Once this history is taken into account by a WAIT command, the IN field can be erased, at least the bits taken into account by the WAIT command, identified in the parameter of the SYNCGRP instruction.

The notification fields of register EV may be write-only and be simple wires that directly transmit the states present in the parameter of the SYNCGRP instruction.

With this configuration, the execution of a SYNCGRP instruction with a given parameter can be summarized by the following steps:

Comparing the content of the IN field of the local register EV with the expected notifications field of the parameter.

Stopping the processor as long as the bits that are set in the expected notifications field are not all set in the IN field.

Waking-up the processor when the bits to 1 of the expected notifications field are all set in the IN field.

Writing the contents of the three notification fields in the fields PEh, PEd and PEv of the EV register. This amounts to writing these contents directly in the corresponding IN fields of the EV registers of the other processors.

Resetting, in the field IN, the bits that were set in the expected notifications field.

These steps can be implemented, with a minor modification cost, by instruction processing units already present in a VLIW processor, in particular the branching unit to manage the comparison and stopping of the processor, and the read/write unit to manage the EV register.

Figure 6:
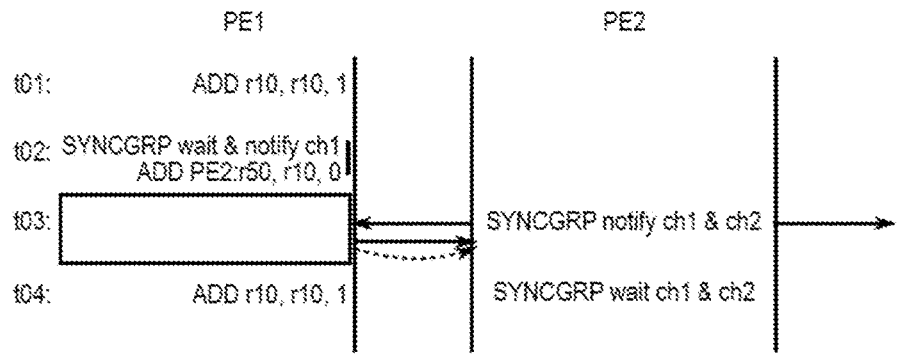
FIG. 6 illustrates a synchronization sequence based on that of FIG. 4, where operation starting points are offset.

FIG. 6 is based on FIG. 4, where the SYNCGRP instruction that was executed in step t01 on processor PE2 is instead executed in step t03. As a result the "wait ch1" command of the SYNCGRP instruction executed at step t02 on processor PE1 halts the processor PE1 before the "notify ch1" command is completed by processor PE1. At step t03, "notify ch1" is received by processor PE1 from processor PE2, causing processor PE1 to resume and send "notify ch1" to processor PE2.

Many variations and modifications of the embodiments described herein will be apparent to the skilled person. Although synchronization techniques have been described in the context of sharing resources between processors, in particular register channels, these synchronization techniques may be applied in any situation where it is desired to "realign" the threads executed in parallel by multiple processors after a series of events. For example, it may be desired that the threads executed in parallel be synchronized at the beginning of each new iteration of a loop, in the case, for example, where the iterations have variable execution times.

What is claimed is:

1. An inter-processor synchronization method, comprising the steps of:

defining a plurality of channels through a point-to-point link between a source processor and a target processor;

providing a group synchronization instruction in an instruction set common to the processors, the group synchronization instruction encoding both a wait command and a notification command, and including a parameter field for identifying respective channels for the wait and notify commands, whereby each processor includes a respective processing unit for each of the wait and notification commands, configured to execute the wait and notification commands simultaneously;

in the source processor, executing a first group synchronization instruction, the processing units configured such that the wait command of the group synchronization instruction places the source processor in a halt state before completion of the notification command of the group synchronization instruction, thereby suspending execution of the notification command;

in the target processor, executing a second notification command with a parameter identifying a channel, causing the corresponding processing unit in the target processor to transmit through the point-to-point link to the source processor a notification signal identifying the channel;

in the source processor, responding to the notification signal from the target processor by comparing the channel of the notification signal to the channel of the wait command of the first group synchronization instruction; and in the source processor, resuming execution of the notification command if the compared channels match, whereby, if a notification signal with a matching channel is received on or before the execution of the first group synchronization instruction, the wait command does not halt the source processor and the notification command completes without suspension.

2. The method of claim 1, wherein the channels are register channels.

3. The method of claim 1, wherein the processors have a Very Large Instruction Word (VLIW) architecture enabling simultaneous execution of multiple instructions conveyed in a same VLIW packet, the method further comprising the steps of:

in the target processor, executing an instruction that releases a shared resource with or before the execution of the second notification command; and in the source processor, executing in the same VLIW packet, the first group synchronization instruction and an instruction for writing in the shared resource, whereby the notification command of the first group synchronization instruction and the write instruction are executed simultaneously upon receipt of the notification signal from the target processor.

4. The method of claim 3, further comprising the following steps carried out in the target processor:

configuring the second notification command in a second group synchronization instruction; and executing the second group synchronization instruction and the instruction releasing the shared resource in the same VLIW packet.

5. The method according to claim 1, further comprising the steps of:

designing the group synchronization instruction of the instruction set to encode multiple wait commands with a parameter field identifying respective channels, and multiple notification commands with a parameter field identifying respective channels; and configuring the processing units of each processor to execute the multiple wait commands and multiple notification commands of the group synchronization instruction simultaneously.

6. The method of claim 1, further comprising the following steps carried out by the processing units of the source processor, upon execution of the wait command of the first synchronization instruction:

comparing the parameter field to a content of an event register;

registering the channel identified by the notification signal from the target processor in the event register; and when the comparison is satisfied, completing the notification command of the first group synchronization instruction and resetting the content of the event register.

7. The method of claim 6, wherein a channel is identified by a respective bit position of the parameter field of the group synchronization instruction;

the step of registering in the event register includes setting the bit position corresponding to the channel identified by the notification signal from the target processor; and upon execution of the wait command in the source processor, execution is resumed when all the bits that are set in the parameter field corresponding to the wait command are set in the event register, whereby the wait command is configurable to cause the source processor to wait simultaneously for multiple notification signals.

8. A multiprocessor system comprising:

point-to-point synchronization channels between two processors, wherein the point-to-point channels are wired so that either of the two processors can write directly in a register of the other of the two processors;

an instruction set common to each processor, including:
an instruction for implementing a wait command with a channel directly identified in a parameter field; and
an instruction for implementing a notification command with a channel identified in a parameter field; and in each processor, instruction processing units configured to:
upon execution in the processor of the notification command of an instruction, set the channel directly identified by the notification command to a notification state; and
upon execution in the processor of the wait command of an instruction, stop the processor, and restart the processor upon detecting the notification state on the channel directly identified by the wait command.

9. The multiprocessor system of claim 8, wherein the processors have a Very Large Instruction Word (VLIW) architecture, and each channel is directly identified by a bit position of the parameter field of the wait and notify commands, and the instruction set comprises an instruction implementing none to multiple wait commands and none to multiple notify commands in parallel, configurable by setting corresponding bits of respective parameter fields for the wait and notify commands.

10. The multiprocessor system of claim 9, wherein each processor comprises an event register including one notify-in field and a respective notify-out field for each of the other processors, the channels being configured to replicate the set bits of each notify-out field to the notify-in field of a corresponding processor.

11. The multiprocessor system of claim 10, wherein the instruction processing units of each processor are configured to:

respond to the wait command by stopping the processor until the wait command parameter field matches the notify-in field of the event register; and respond to the notify command by writing the notify command parameter field in a corresponding notify-out field of the event register.

* * * * *